United States Patent [19]

Rue et al.

[11] 3,989,423
[45] Nov. 2, 1976

[54] PISTON OF LIGHT METAL FOR A ROTARY PISTON COMBUSTION ENGINE

[75] Inventors: Max Rue, Obereisesheim; Horst Ehemann, Bad Friedrichshall II; Konrad Lummerzheim, Neckargartach, all of Germany

[73] Assignees: Audi NSU Auto Union Aktiengesellschaft, Neckarsulm; Wankel GmbH, Lindau, both of Germany

[22] Filed: July 2, 1975

[21] Appl. No.: 592,456

[30] Foreign Application Priority Data

July 4, 1974  Germany............................ 2432077

[52] U.S. Cl.............................. 418/61 A; 418/179; 74/433
[51] Int. Cl.²..................... F01C 1/02; F01C 21/00; F16H 55/00
[58] Field of Search.................. 418/61 A, 179; 123/8.01, 8.45; 74/433

[56] References Cited
UNITED STATES PATENTS

| | | |
|---|---|---|
| 3,059,585 | 10/1962 | Froede et al..................... 418/61 A |
| 3,111,261 | 11/1963 | Bentele et al.................... 418/61 A |
| 3,230,789 | 1/1966 | Jones................................ 418/61 A |
| 3,269,370 | 8/1966 | Paschke et al.................. 418/61 A |
| 3,383,936 | 5/1968 | Corwin............................. 418/61 A |
| 3,425,620 | 2/1969 | Thornton.......................... 418/61 A |
| 3,469,505 | 9/1969 | Bensinger......................... 418/61 A |
| 3,887,307 | 6/1975 | Pratt................................. 418/61 A |

FOREIGN PATENTS OR APPLICATIONS 1,158,315  11/1963  Germany........................... 123/8.01

Primary Examiner—John J. Vrablik
Attorney, Agent, or Firm—Kane, Dalsimer, Kane, Sullivan and Kurucz

[57] ABSTRACT

A piston of light metal for a rotary piston combustion engine of trochoid type is rotatably mounted on the eccentric of an eccentric shaft. A hollow steel gear is arranged coaxially with the axis of rotation of the piston and is in engagement with a stationary pinion fixed to the housing coaxially with the axis of rotation of the eccentric shaft.

4 Claims, 1 Drawing Figure

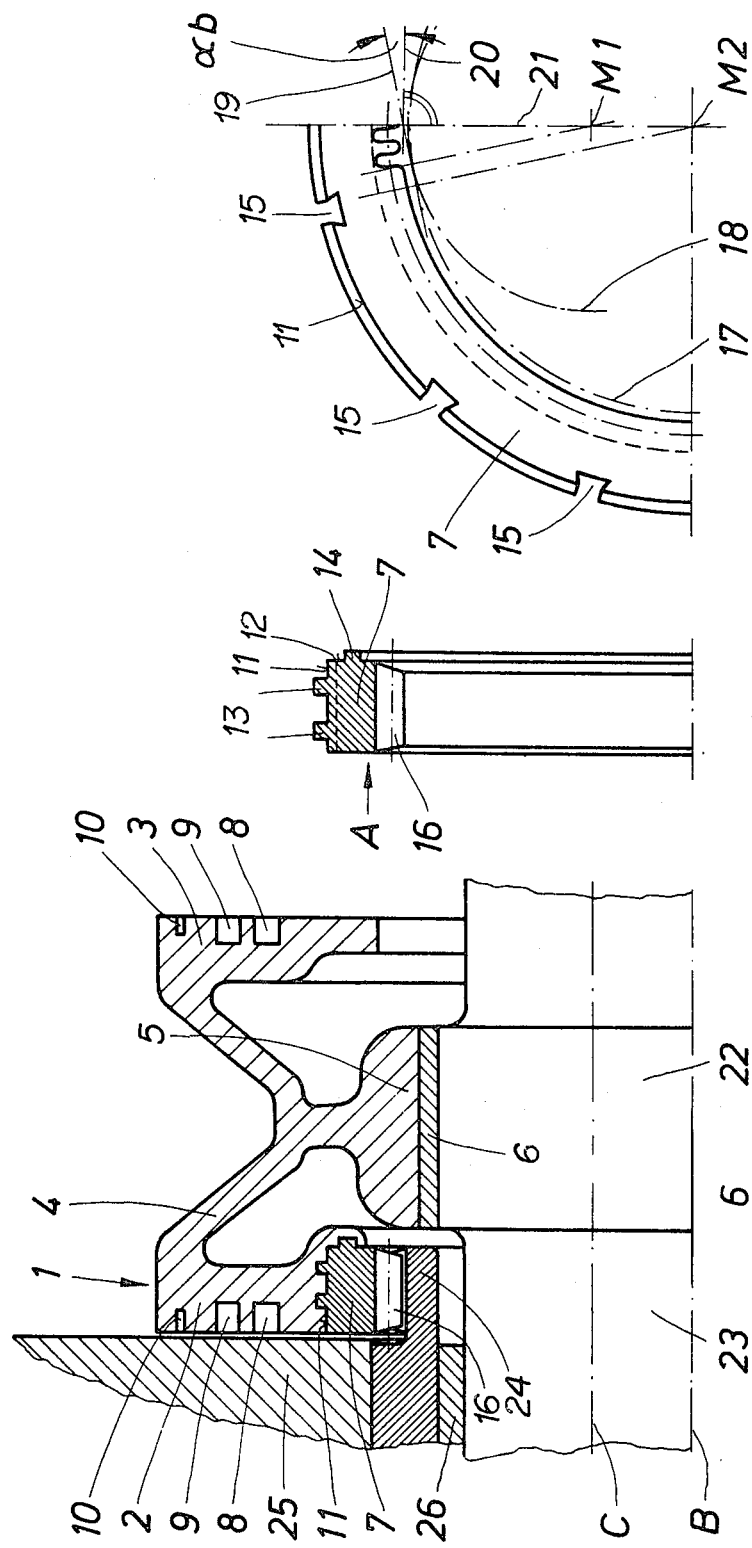

PISTON OF LIGHT METAL FOR A ROTARY PISTON COMBUSTION ENGINE

BACKGROUND OF THE INVENTION

In known pistons for rotary piston combustion engines the piston and associated hollow gear consist of materials of appreciably different coefficients of heat expansion. It has been found that as a result of the differential heat expansion of the piston, normally of light metal, and the hollow gear, commonly of steel, damage may occur by the sliding friction of the contact surfaces between the gear and the piston, which causes abrasion of the light metal piston.

SUMMARY OF THE INVENTION

The object of the invention is to eliminate any relative motion between the hollow gear and the light metal piston.

This object is accomplished by constructing the hollow gear of a steel whose coefficient of expansion corresponds with that of the piston material, and, at the same time, with teeth having an angle of mesh between 7° and 15°.

As a result of the substantially equal coefficients of expansion of the piston and the gear, no relative motion takes place between these parts. Furthermore, owing to the proposed angle of mesh, the backlash between the teeth of the hollow gear and the teeth of the pinion in engagement with it is kept within tolerable limits despite the greater coefficient of expansion compared to the usual gear material. At low as well as high temperatures, such an angle of mesh will considerably reduce noise and it avoids loads favorable to wear.

The hollow gear may consist of an austenitic steel whose coefficient of expansion matches that of the piston material and is readily able to assume the mechanical loads encountered.

The hollow gear is preferably cast into the piston. This eliminates the screw connections and very bulky attachment flange required by other known arrangements. In this way, through elimination of bulky and costly means of attaching the hollow gear a compact construction is achieved. Inasmuch as the parts expand alike, no relative motion occurs.

In order to provide a positive and secure geometrical connection between the gear and the piston, the gear may be provided with anchors formed by circumferential ribs and axial grooves in the areas of contact with the piston. With such a connection, which at the same time increases the area of adhesion a satisfactory torsional safety and secure grip between the piston and the gear can be obtained.

BRIEF DESCRIPTION OF THE DRAWINGS

An embodiment of the invention is illustrated by way of example in the drawings and described below.

FIG. 1 is a longitudinal section of one half of the piston with cast hollow gear;

FIG. 2 is a section of the half gear of FIG. 1; and

FIG. 3 shows a sector of the hollow gear in the direction of the arrow A in FIG. 2.

DETAILED DESCRIPTION

Reference initially is made to FIG. 1 in which the embodiment of the light metal piston 1 is composed essentially of two parallel end walls 2 and 3, an outer peripheral wall 4 forming the flanks of the piston, and a central hub 5. The piston 1 is rotatably mounted by means of a bearing 6 on the eccentric 22 of an eccentric shaft 23. The end wall 2 of piston 1 carries a hollow gear 7 connected to the piston 1 by casting it in place, such that it is coaxial with the axis of rotation B of the piston. The hollow gear 7 is in engagement with a pinion 24 fixed to end part 25 of the engine housing coaxially with the axis of rotation C of the eccentric shaft 23. The pinion 24 is provided with a bearing surface 26 in which the eccentric shaft 23 runs. The hollow gear 7 and pinion 24 form a train that holds the speed of piston 1 in a fixed ratio to the speed of eccentric shaft 23 and secures a certain phase position of the polygonal piston 1 in relation to the multiarcuate interior surface of the housing of the rotary piston engine. The end walls 2 and 3 of piston 1 are provided with two annular grooves 8 and 9 and sealing strip recesses 10 to accommodate sealing elements (not shown) cooperating with the end parts 25.

Fixation of the hollow gear 7 by casting in the end wall 2 of piston 1 is possible because the hollow gear 7 consists of an austenitic steel, as for example X 25 Cr Ni Mn P 18/8, whose coefficient of expansion matches that of the light metal piston 1. In this manner, the hollow gear 7 requires no separate attachment flange for additional screws, thereby reducing the outer circumference 11. As an additional advantage the simplified construction provides adequate space in the end wall 2 of piston 1 to accommodate the annular grooves 8 and 9 for suitable packing members.

For proper stability of the connection of hollow gear 7 to piston 1 circumferential ribs 13 and 14 are provided on the periphery 11, and face 12 of the hollow gear 7 in the areas of contact with piston 1, as well as a plurality of axial grooves 15 arranged on the periphery 11. The ribs 13 and 14 and grooves 15, the recesses of which are filled with light metal of piston 1 after casting, provides an axial and radial grip and consequently security against torsion to transmit the torque between gear 7 and piston 1. Sliding friction between the cast-in hollow gear 7 and the piston 1 cannot occur in the areas of contact ribs 13, 14 and grooves 15, even under the influence of heat owing to their like expansion.

The teeth 16 of the hollow gear 7 are so designed that there is a minimum of backlash even at low engine temperatures, whereas with allowance for heat expansion during operation of the engine, a backlash of about 0.25 mm is reached. This is representative of known gear combinations and providing a clearance within the usual tolerances, largely avoids noise and significant wear. Hence, the angle of mesh $\alpha b$ (FIG. 3) of the rack is between 7° and 15°. The angle of mesh $\alpha b$ is measured between the legs of the common tangent 19 of the root circles 17 and 18 of gear 7 and pinion 24 and a perpendicular 20 to the line 21 joining the centers M1 and M2 of the two root circles 17 and 18. The axis of rotation C of eccentric shaft 23 passes through center M1, and the axis of rotation B of piston 1 through center M2.

The teeth 16 may be rough-machined before the hollow gear 7 is cast into piston 1 and serve as a purchase in the casting fixture, so as to lessen the machining required after casting.

Needless to say, the pinion 24 fixed to the end part 25 of the housing has the same angle of mesh as the gear 7.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A piston of light metal for a rotary piston combustion engine of trochoid type having a housing for accommodating the piston, the piston being rotatably mounted on the eccentric of an eccentric shaft and bearing a separate hollow gear of steel arranged coaxial with the axis of rotation of the piston, the gear being in engagement with a stationary pinion fixed to the housing and arranged coaxial with the axis of rotation of the eccentric shaft, the hollow gear being of a steel whose coefficient of expansion matches and is substantially equal to that of the piston material so that there is relatively no relative movement between the gear and piston due to different heat expansion during engine operation and the gear having teeth with an angle of mesh ($ab$) between 7° and 15° thereby reducing to tolerable limits, the backlash between the teeth of the gear and the engaged teeth of the pinion.

2. A piston according to claim 1, wherein the hollow gear is an austenitic steel.

3. A piston according to claim 1, wherein the hollow gear is cast into the piston.

4. A piston according to claim 3, wherein the hollow gear is provided with anchorings formed by circumferential ribs and axial grooves in the areas of contact with the piston.

* * * * *

UNITED STATES PATENT OFFICE
CERTIFICATE OF CORRECTION

PATENT NO. : 3,989,423
DATED : November 2, 1976
INVENTOR(S) : Max Ruf, et al

It is certified that error appears in the above-identified patent and that said Letters Patent are hereby corrected as shown below:

The name of one of the inventors appears as "Max Rue"

it should be --Max Ruf--.

Signed and Sealed this

Eleventh Day of January 1977

[SEAL]

Attest:

RUTH C. MASON
Attesting Officer

C. MARSHALL DANN
Commissioner of Patents and Trademarks